United States Patent [19]
Schnautz

[11] Patent Number: 6,076,797
[45] Date of Patent: Jun. 20, 2000

[54] MOLD SEALING PLUG

[76] Inventor: Kurt Schnautz, 2307 E. Mulberry St., Evansville, Ind. 47714

[21] Appl. No.: 09/164,708

[22] Filed: Oct. 1, 1998

[51] Int. Cl.⁷ .................................................. B65D 53/00
[52] U.S. Cl. ............................ 249/79; 220/236; 220/235; 249/141
[58] Field of Search ............................... 249/79, 81, 204, 249/187.1, 141; 425/472; 220/235, 236; 215/360

[56] References Cited

U.S. PATENT DOCUMENTS

| | | | |
|---|---|---|---|
| 683,082 | 9/1901 | Summerer | 411/24 |
| 1,120,409 | 12/1914 | Rohmer et al. | 411/24 |
| 3,202,034 | 8/1965 | Korencham | 411/24 |
| 3,667,640 | 6/1972 | Morrow | 220/235 |
| 4,380,302 | 4/1983 | Broad | 220/235 |
| 4,789,282 | 12/1988 | Abraham | 411/24 |
| 4,856,929 | 8/1989 | Smahlik et al. | 403/297 |
| 4,946,325 | 8/1990 | Abraham | 411/24 |
| 5,297,691 | 3/1994 | Bottcher | 220/236 |
| 5,657,890 | 8/1997 | Lin | 249/79 |

OTHER PUBLICATIONS

Data Sheet, D–M–E Standard, *Threadless Brass Pressure Plugs* p. L–15, (No date).
Data Sheet, D–M–E Standard, *Jiffy–Tire Cascade Water Junctions*, p. L–16, no date).
Data Sheet, HASCO, *Sealing Plugs*, Z942, p. 1/90, (no date).
Data Sheet, Hasco, *Assembly Set*, Z945, Printed in Germany, (no date).

*Primary Examiner*—Robert Davis
*Assistant Examiner*—Thukhanh T. Nguyen
*Attorney, Agent, or Firm*—Woodard, Emhardt, Naughton Moriarty & McNett

[57] ABSTRACT

An apparatus for blocking a hole, especially for blocking a passageway within a mold. The apparatus includes one or more tapered members received within recesses of an expandable sleeve. As the one or more tapered members are drawn within the sleeve by a fastener, the outer diameter of the sleeve expands so as to substantially block the hole. The apparatus also includes a surface with threads that are the opposite hand of the threads of the fastener. This second set of opposite hand threads permit holding and placing the apparatus within a location of the hole, and also for reacting the torque applied by a second tool used to tighten the fastener.

19 Claims, 9 Drawing Sheets

MOLD SEALING PLUG

BACKGROUND OF THE INVENTION

The present invention relates to an apparatus for blocking a hole, especially an apparatus for blocking a hole that is a passageway of a mold, such as an injection mold or diecast mold.

Injection molds are often machined from thick plates of metal, such as aluminum or steel. By so machining the injection molds with thick cross sections, the dimensional stability of the mold, and also the dimensional repeatability of the molded components, is maintained to a high degree of accuracy. These molds are typically used at elevated temperatures and elevated internal pressures so as to enhance the flow of molten material into the molding cavity.

The usage of the injection molds at elevated temperatures results in some thermal distortion of the molds due to thermal growth. In order to manage this thermal growth, the injection molds are sometimes cooled. In some injection molds, a cooling liquid flows through various passageways drilled within the molds in areas where it is necessary to reject heat. Sometimes in the drilling of these passageways, a passageway may be overdrilled such that it undesirably connects to other intersecting passageways in its path. In cases such as this, it is necessary to substantially block fluid communication between the two intersecting cooling passageways.

In order to block flow between the two passageways, a sealing plug may be inserted within the crossing passageway and placed at a point where it blocks communication between the two intersected passageways. After the plug is placed in location, it may be necessary to take some action to cause the plug to seal the cavity and stay in position. As an example, one sealing plug includes two generally cylindrical members and a fastener for holding the two members together. An O-ring is placed between the two members. As the fastener is tightened, the two members are drawn together and the O-ring is squeezed outwardly so as to seal the hole. However, it is difficult to precisely locate these plugs within a passageway. Sometimes the only way to position the plug is by incorporating a hexagonal socket on the fastener, and pushing the plug into location with an Allen wrench. If the plug is pushed too deep within the passageway, it is difficult to pull the plug out since the Allen wrench does not positively grasp the socket.

In yet other designs, the plugs have external tapered threads. The passageway to the plug must likewise incorporate tapered threads. Cutting these threads into the mold creates burrs and other chips which must then be flushed from the mold. Further, the machining of threads into the mold increase the expense of the mold.

What is needed is an apparatus that overcomes the difficulties of current designs. The present invention does this in a novel and an obvious way.

SUMMARY OF THE INVENTION

In one aspect of the present invention there is an apparatus for blocking a hole. The apparatus includes first and second tapered members, an expandable sleeve, and a fastener. The first tapered member has a first threaded portion having one of a right-hand or left-hand thread. The second tapered member has a second threaded portion having the other of the right-hand or left-hand thread. The expandable sleeve has two ends, the sleeve slidably receiving the first tapered member in one end and receiving the second tapered member in the other end. The fastener engages the first threaded portion, such that tightening of the fastener expands the sleeve.

In another aspect of the present invention there is an apparatus for blocking a hole. The apparatus includes a first tapered member with a first threaded portion, and a second tapered member with a second threaded portion. There is also a sleeve with two ends, the sleeve slidably receiving the first tapered member in one end and slidably receiving the second tapered member in the other end. There is also a tightenable fastener engaging the first threaded portion, wherein the apparatus is held by the second threaded portion when the fastener is tightened.

In another aspect of the present invention, there is an apparatus for blocking a hole comprising two tapered members, an expandable sleeve, and a fastener. The first tapered member has a first threaded portion. The second tapered member has a second threaded portion for holding the apparatus at a location in the hole. The expandable sleeve has two ends, the sleeve slidably receiving the first tapered member in one end and slidably receiving the second tapered member in the other end. There is also a fastener engaging the first threaded portion, such that the first tapered member and second tapered member expand the sleeve and block the hole when the fastener is tightened.

In another aspect of the present invention, there is an apparatus for blocking a hole, including a tapered member, an expandable sleeve, and a fastener. The tapered member has a first threaded portion having one of right-hand or left-hand thread. The first tapered member also has a bore. The expandable sleeve has a recess for receiving the tapered member therein. The sleeve includes a second threaded portion having the other of the right-hand or left-hand thread. The fastener is slidable within the bore and threadably engages the second threaded portion, wherein tightening of the fastener causes the tapered member to expand the sleeve and block the hole.

In another aspect of the present invention, there is an apparatus for blocking a hole comprising a tapered member, an expandable sleeve, and a fastener. The expandable sleeve has a recess, the sleeve receiving the tapered member within the recess. The sleeve has a threaded bore and a threaded cylindrical surface, the bore having one of a right-hand or left-hand thread, the surface having the other of the right-hand or left-hand thread. The fastener is threadably received within the threaded bore, such that tightening the fastener causes the tapered member to expand the sleeve and block the hole.

These and other objects of the present invention will be apparent from the description of the preferred embodiment, the claims, and the drawings to follow.

DETAILED DESCRIPTION OF THE PREFERRED EMBODIMENT

Figure 1:
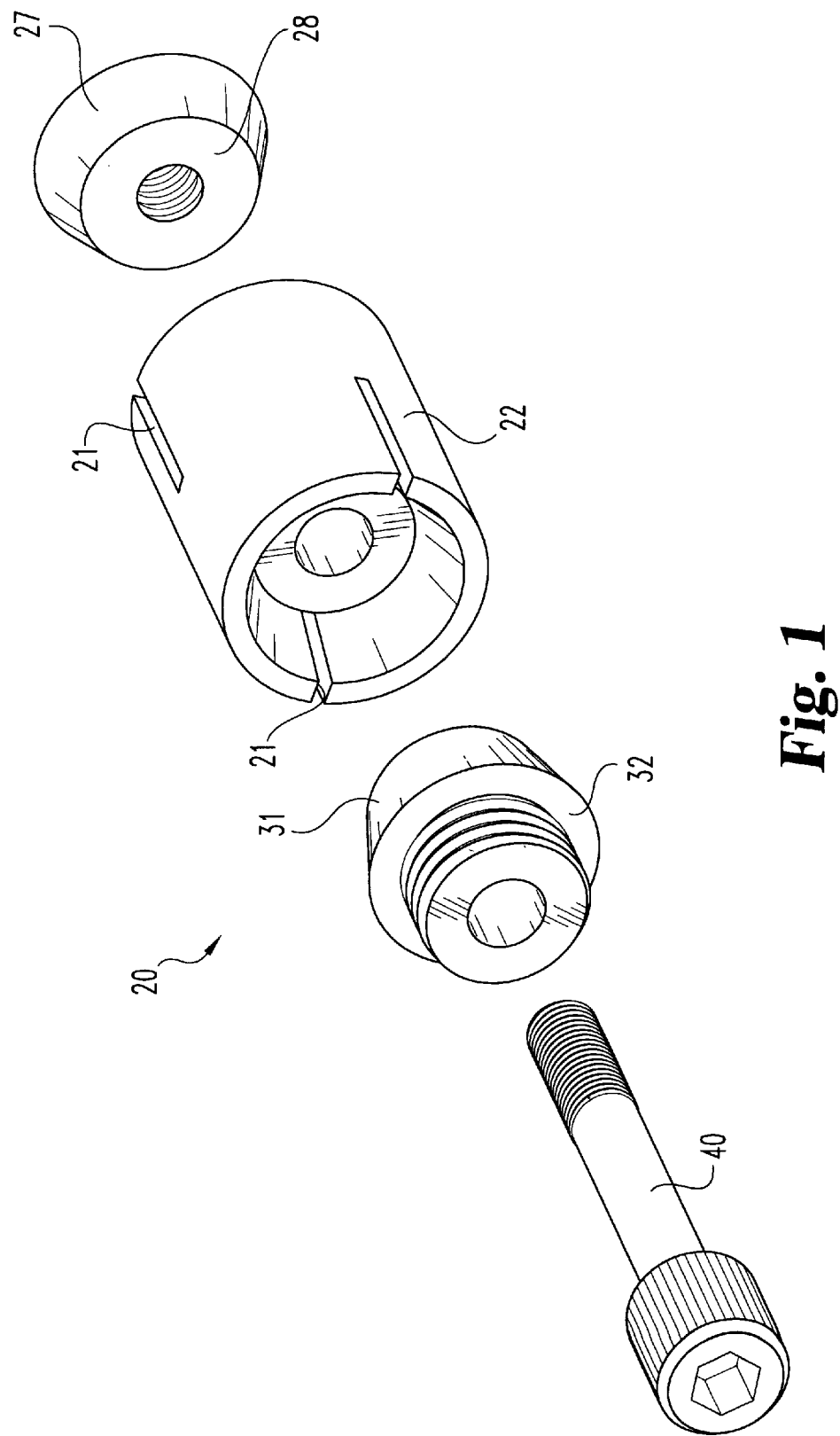
FIG. 1 is an exploded, perspective view of one embodiment of the present invention.

For purposes of promoting an understanding of the principles of the invention, reference will now be made to particular embodiments of the invention and specific language will be used to describe the same. It will nevertheless be understood that no limitation of the scope of the invention is thereby intended, such alterations and further modifications in the invention, and such further applications of the principles of the invention as described herein being contemplated as would normally occur to one skilled in the art to which the invention pertains.

The present invention relates to a plug assembly for plugging holes, especially for plugging drilled passageways in components such as molds used for injection molding. Often these molds included drilled passageways for cooling the halves of the mold, which would otherwise overheat and undesirably distort. These passageways are often drilled in straight lines throughout those portions of the mold where cooling is desired. These drilled passageways often intersect each other so that coolant from one passage is provided to another passage. However, sometimes a drilled passage extends too far and connects undesirably with two other drilled passageways, and fluid communication to one of the other drilled passageways must be stopped.

The present invention provides an apparatus for easily plugging holes in a passageway at a predetermined location. Preferably, only two simple tools are needed for placing the plug assembly at a location and tightening it so as to substantially block the hole. The first tool holds the plug assembly in place using one threaded surface of the plug assembly. The second tool tightens a threaded, standard fastener so as to expand the plug assembly and block the hole. Preferably, the first tool threads onto the plug assembly with threads that are the opposite hand of the threads of the fastener.

Preferably, the present invention includes an expandable sleeve, one or more tapered plugs, and a fastener that is tightenable so as to cause the one or more of the plugs to fit within the sleeve and cause it to expand. The sleeve is preferably cylindrical in shape. Further, the sleeve preferable includes one or more recesses for receiving the tapered plugs. In addition, the sleeve includes features that make the sleeve expandable for blocking the hole. These features include one or more features known to those of ordinary skill in the art, for example thin walls, longitudinal slots, or lower stiffness materials such as nylon or other organic materials.

The one or more plugs that are received within recesses of the expandable sleeve are means for expanding the sleeve. Preferably, the plugs include a tapered feature such as tapered walls or, most preferably, a conical surface. As the plug is driven into a recess of the sleeve, the tapered feature is driven into the recess and causes the walls of the expandable sleeve to expand.

Preferably, the plugging apparatus also includes means for driving the expanding means into the sleeve. The driving means include nuts, bolts, and related fasteners. Preferably, the driving means is a standard fastener such as an Allen bolt or a hex nut. As the driving means is tightened, one or more tapered plugs are driven within one or more recesses of the sleeve and cause the sleeve to expand and block the hole.

Figure 2:
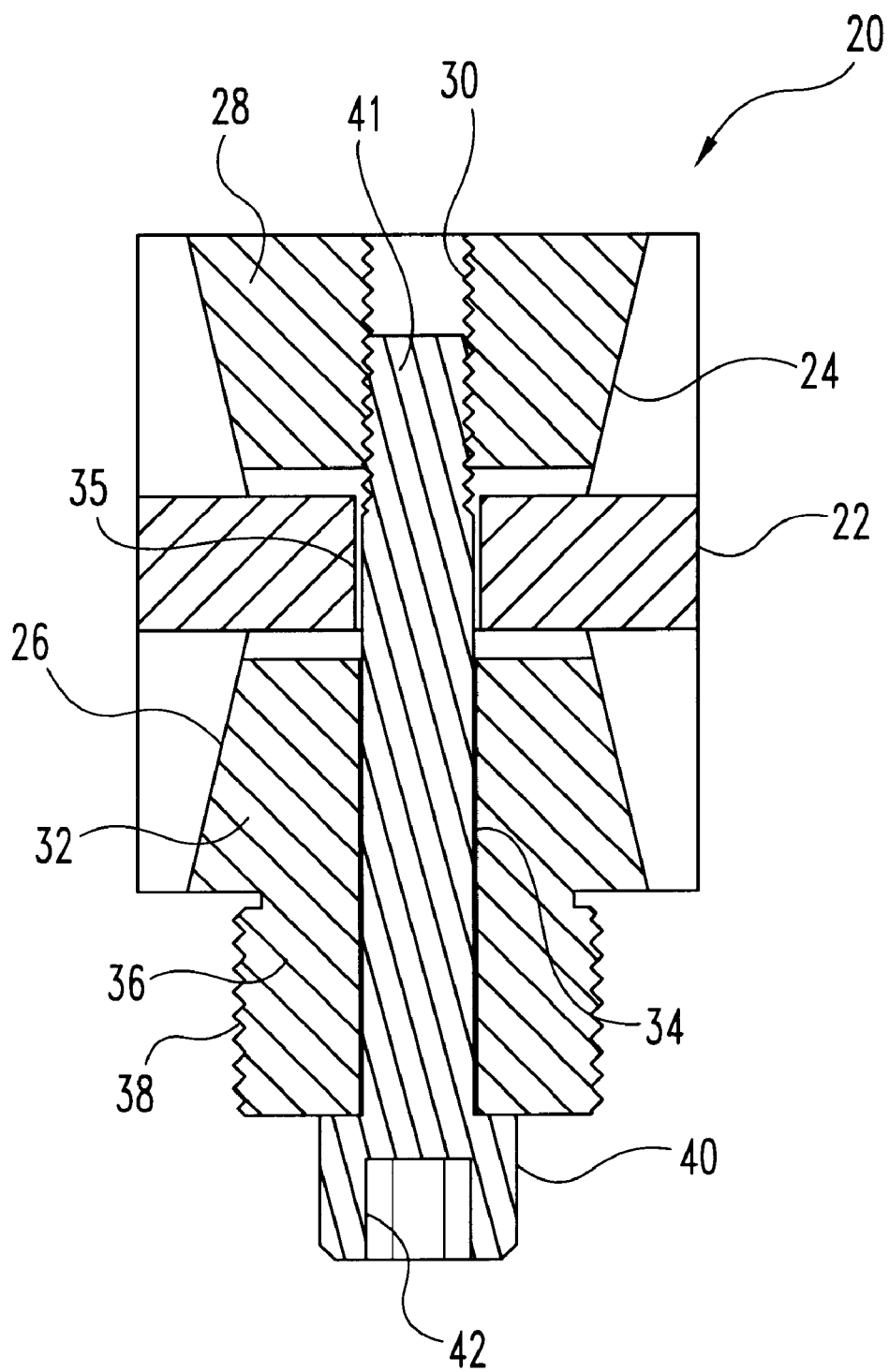
FIG. 2 is a cross sectional cutaway view of the assembled apparatus of FIG. 1.

Referring to FIGS. 1 and 2, there is shown apparatus 20, one embodiment of the present invention. Apparatus 20 includes an expandable sleeve 22, a first tapered member 28, a second tapered member 32, and a fastener 40. Expandable member 22 preferably has a generally cylindrical outer surface. In one embodiment, a plurality of longitudinal slots 21 locally weaken sleeve 22 so as to make it more easily expandable. Although sleeve 22 has been shown and described as having slots so as to improve its expandability, the present invention also includes other ways in which to improve expandability known to those of ordinary skill in the art, including the use of thin-wall sections and the use of lower strength organic materials, such as nylon.

Expandable sleeve 22 includes on one end a recess 24 for slidably receiving first tapered member 28, and on the other end a second recess 26 for slidably receiving the second tapered member 32. Recess 24 of sleeve 22 has a shape that cooperates with tapered surface 27 of member 28, so that as member 28 is driven within recess 24, sleeve 22 locally expands. Likewise, recess 22 has a shape that cooperates with tapered surface 31 of second tapered member 32 so that as tapered member 32 is driven within recess 26, sleeve 22 locally expands. Preferably, outer surfaces 27 and 31 are generally conical and slide within conical recesses 24 and 26, respectively. Surface 27 cooperates with recess 24 so as to provide expansion of sleeve 22 with any of those shapes known by those of ordinary skill in the art to so provide a wedging and expanding action. Also, surface 31 cooperates with recess 26 so as to provide expansion of sleeve 22 with any of those shapes known by those of ordinary skill in the art to so provide a wedging and expanding action.

Tapered member 28 includes a first threaded portion 30, which is threaded with one of either right hand or left-hand threads. Preferably, threaded portion 30 is a cylindrical bore with right-hand threads. Second tapered member 32 includes a generally smooth bore 34, and expandable sleeve 22 includes a smooth bore 35. As best seen in FIG. 2, fastener 40 has a threaded shank 41 that slides through bores 34 and 35 and threadably engages first threaded portion 30. With tapered members 28 and 32 positioned within their respective recesses of sleeve 22, fastener 20 is threadably engaged with first threaded portion 30 and can be tightened. As fastener 40 is tightened, tapered members 28 and 32 are driven within recesses 24 and 26, respectively, resulting in expansion of portions of sleeve 22. Since the outer cylindrical surface of sleeve 22 is a close fit within the hole to be blocked, expansion of sleeve 22 in the areas local to recesses 24 and 26 causes those portions to substantially block the hole.

In one embodiment of the present invention, fastener 40 is an Allen screw with a hexagonal pocket 42 for turning the screw. Threaded portion 30 preferably includes right-hand threads of a standard dimension. However, the present invention also contemplates the use of a custom made fastener to engage the threaded portion of the tapered member. Although it is preferable to use right-hand threads because of the more common availability of right-handed fasteners, the present invention also contemplates the use of fasteners with left-hand threads.

Tapered member 32 includes a cylindrical portion 36, which has threads 38. Threads 38 are preferably of the opposite hand to the hand chosen for threads 30 of tapered member 28. Most preferably, threads 38 are left-hand threads. Threaded portions 38 and 30 cooperate to provide a way in which to hold apparatus 20 at a particular location within a hole and also to tighten a fastener so as to cause the apparatus to expand and block the hole.

Figure 9:
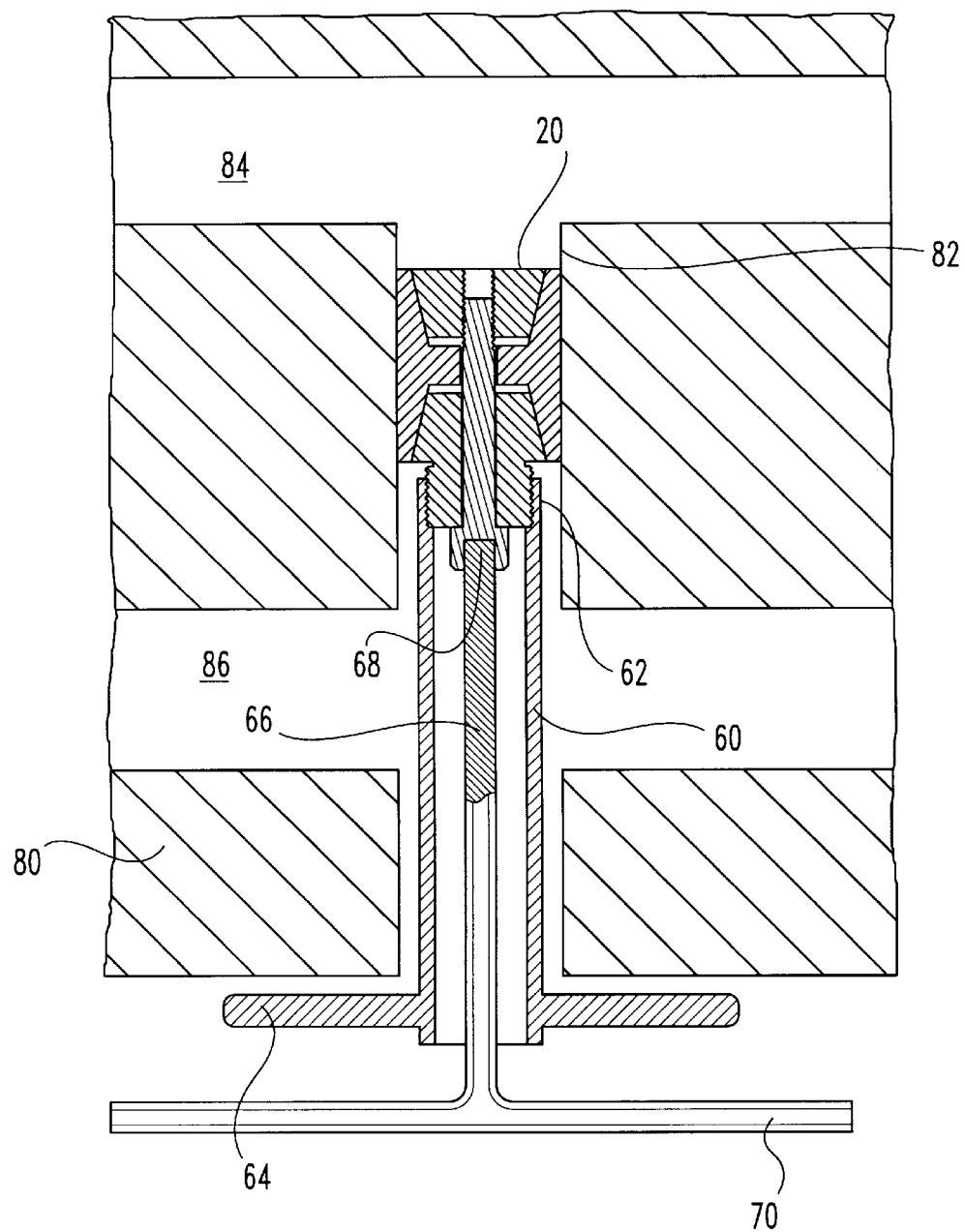
FIG. 9 is a cross sectional view of a portion of a mold showing the apparatus of FIG. 2 placed at a location within a hole.

Referring to FIG. 9, apparatus 20 is shown located within a hole 82 within a mold 80. A holding tool 60 with threaded portion 62 threadably engages threads 38 of apparatus 20. A T-handle 64 of holding tool 60 permits a person to place apparatus 20 at a precise location within hole 82. A second tightening tool 66 is shown inserted within an interior bore of holding tool 60, with end 68 of tightening tool 66 engaging hexagonal pocket 42 of fastener 40. With the tools placed as shown, an operator tightens fastener 40 by holding T-handle 64 steady and turning T-handle 70 of tightening tool 66 so as to tighten fastener 40 and thus cause tapered members 28 and 32 to expand portions of sleeve 22. Because thread 30 is of the opposite hand to thread 38, the reacting torque that is applied to T-handle 64 during tightening of fastener 40 is in a direction that tightens holding tool 60 onto threads 38 of tapered member 32.

After fastener 40 has been tightened to substantially block hole 82, tightening tool 66 is removed. Holding tool 60 is then removable by unscrewing threaded end 62 of tool 60 from threads 38 of apparatus 20. The reacting torque required to hold apparatus 20 stationary while tool 60 is being removed is minimal since threads 38 preferably do not include a thread-locking feature. The reacting torque to hold apparatus 20 in place is provided by friction between the expanded outer surface of sleeve 22 and the wall of hole 82. With apparatus 20 in place within passageway 82, fluid communication between internal intersected passageways 84 and 86 is substantially blocked.

Figure 3:
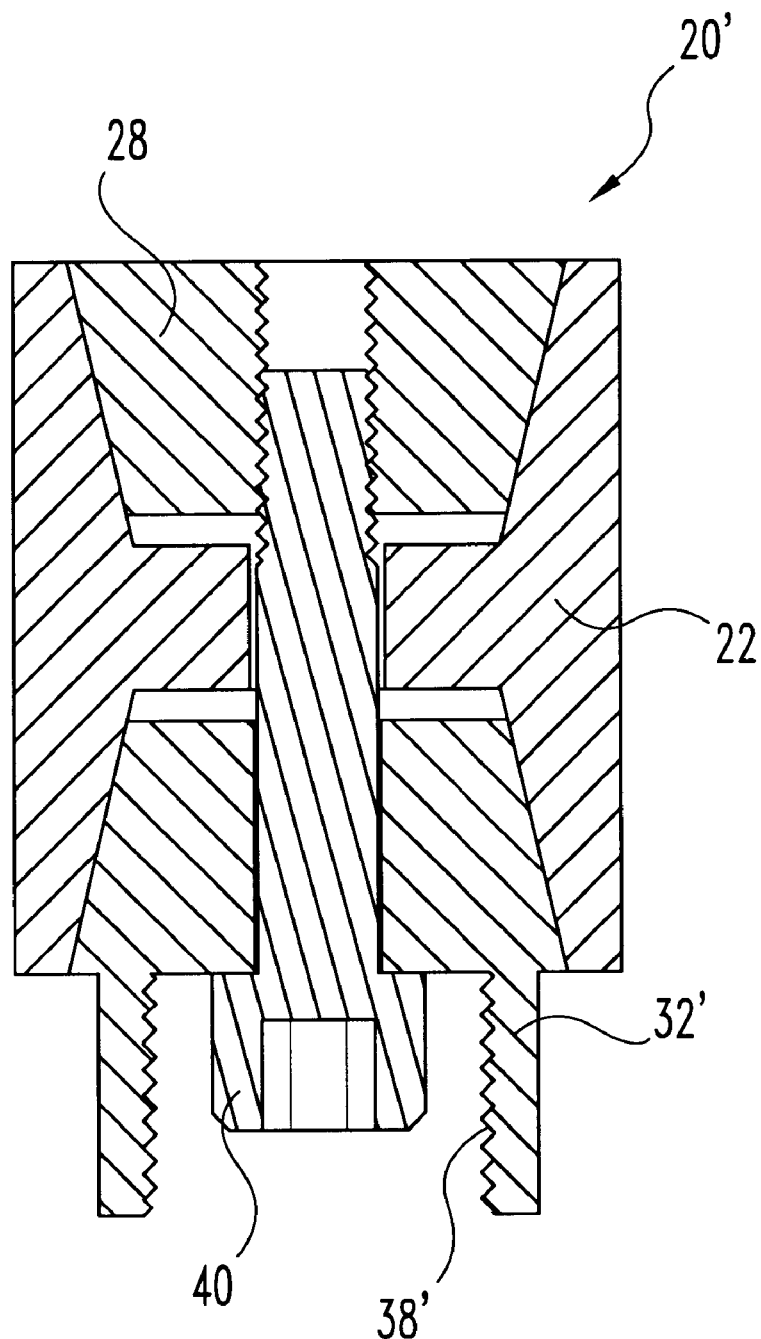
FIG. 3 is a cross sectional cutaway view of another embodiment of the present invention.

FIG. 3 depicts an apparatus 20', another embodiment of the present invention. Apparatus 20' is similar to apparatus 20, except that it includes threads 38' along an inner diameter of tapered member 32'. Apparatus 20' is used in a manner similar to that of apparatus 20, except holding tool 60 includes a threaded portion 62 with external threads.

Figure 4:
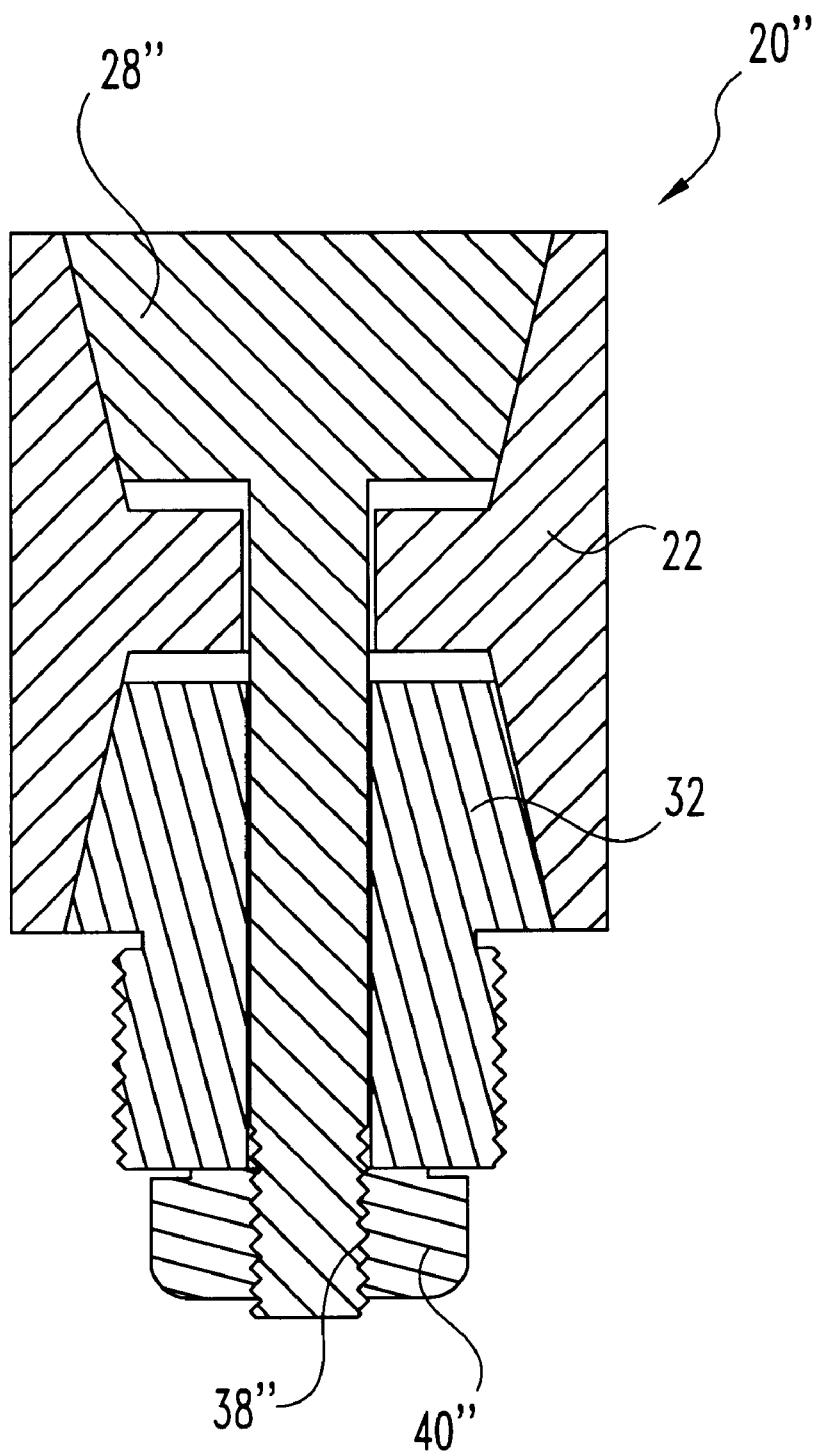
FIG. 4 is a cross sectional cutaway view of another embodiment of the present invention.

An apparatus 20" according to another embodiment of the present invention is shown in FIG. 4. Apparatus 20" is similar to apparatus 20, except that fastener 40" is a nut that threadably engages threads 38" of a cylindrical shank that is integral with first tapered member 28." Apparatus 20" is held within a location in a hole by a tool in a manner similar to that of apparatus 20. However, the tightening tool for apparatus 20" would be constructed and arranged to accept the shape of fastener 40."

Figure 5:
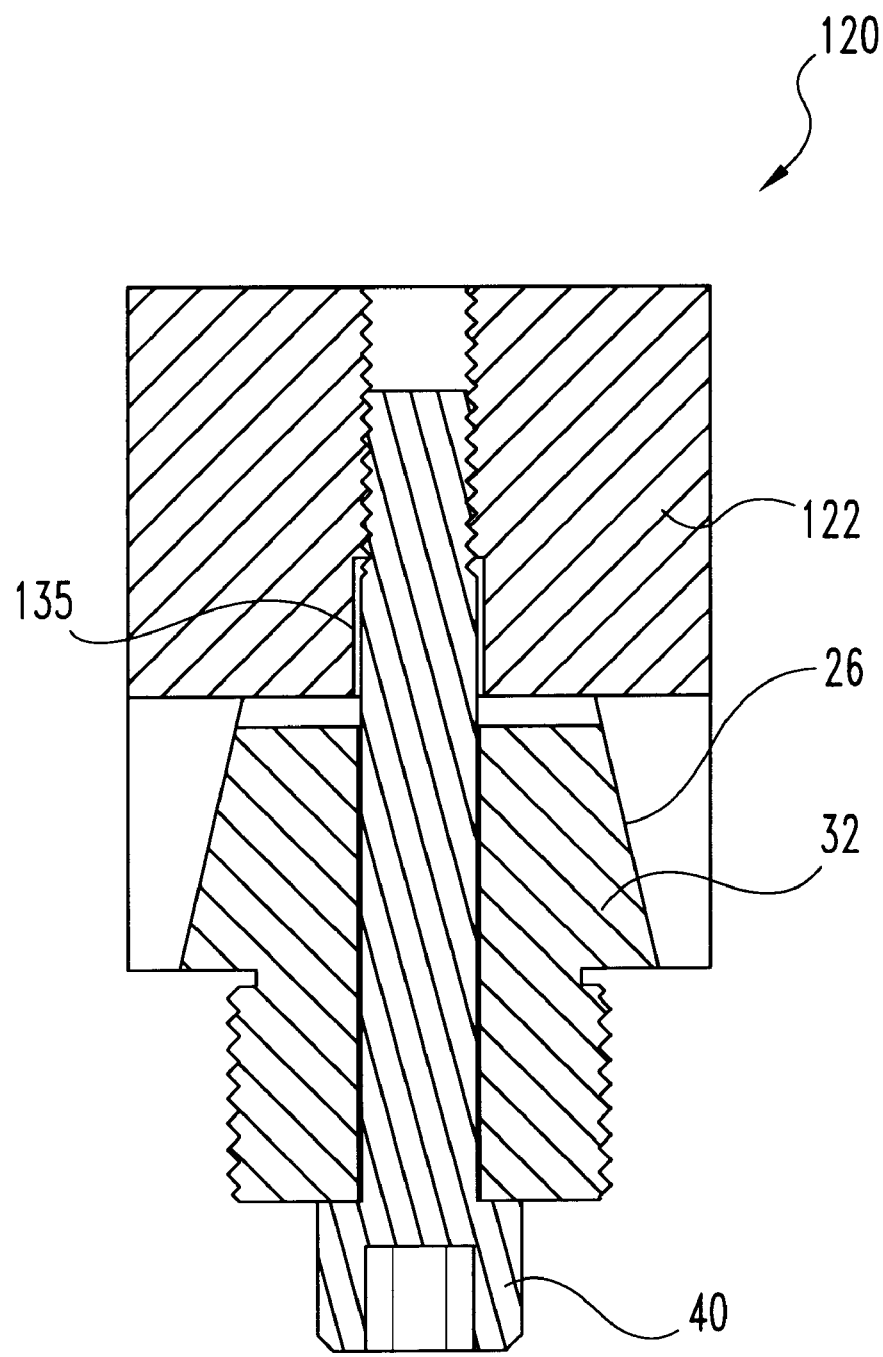
FIG. 5 is a cross sectional cutaway view of another embodiment of the present invention.

FIG. 5 depicts another embodiment of the present invention, a plug apparatus 120 is for blocking a hole. Apparatus 120 is similar to apparatus 20, except that expandable sleeve 122 includes only a single recess 26 to cooperate with tapered member 32 for expanding the outer diameter of sleeve 122. Sleeve 122 includes a threaded bore 135 into which fastener 40 threadably engages. Tightening of fastener 40 into sleeve 122 results in expansion of the outer surface of sleeve 22 in areas local to recess 26 and with minimal expansion of sleeve 122 proximate to threaded bore 135. Apparatus 120 is located and held within a hole in a manner similar to that of apparatus 20. Apparatus 120 is tightened for sleeve expansion also in a manner similar to that of apparatus 20. Those of ordinary skill in the art will recognize that apparatus 120 could also be modified to include a threaded shank similar to threaded shank 38" of apparatus 20", and could also incorporate threads 38' of apparatus 20'.

Figure 6:
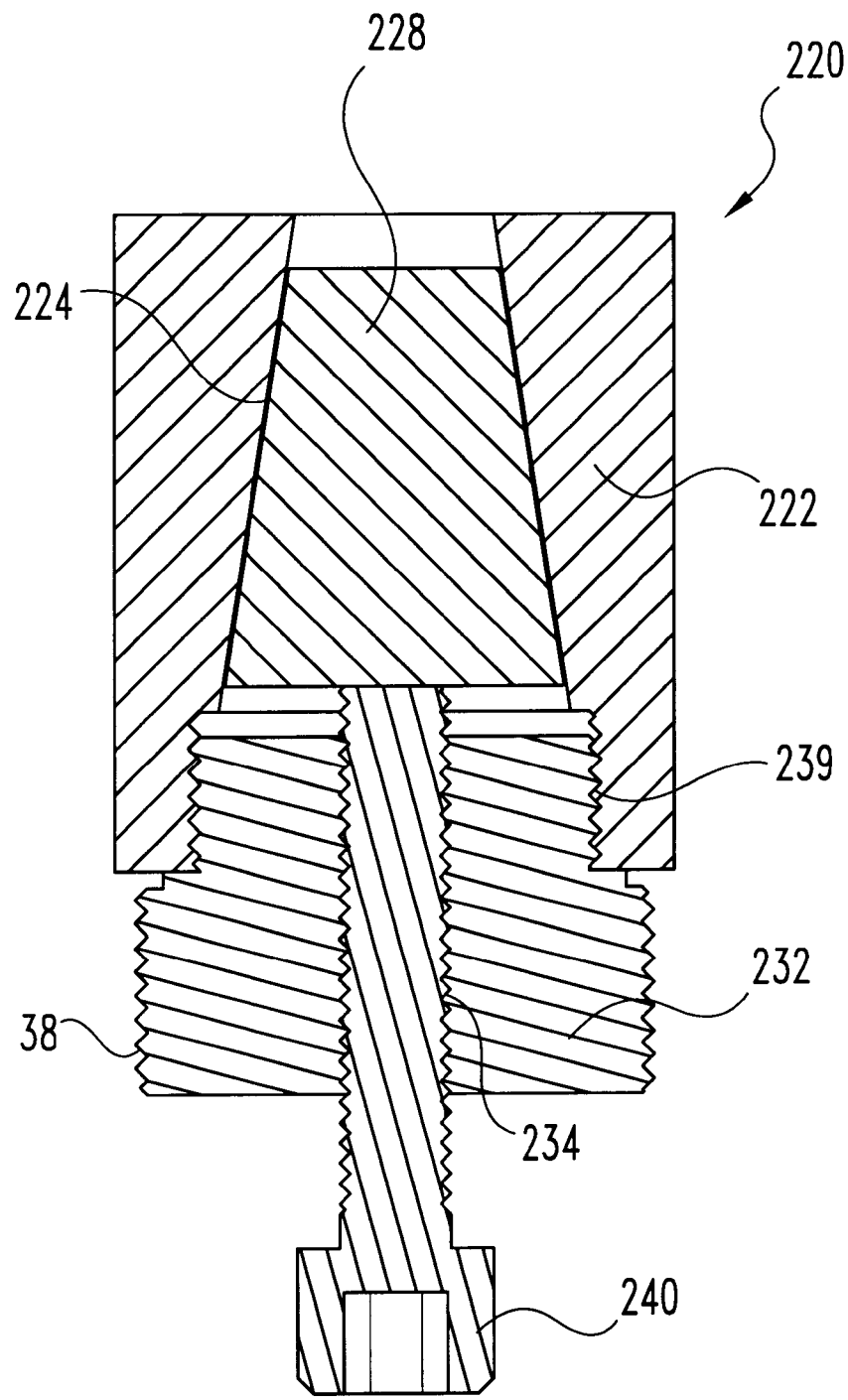
FIG. 6 is a cross sectional cutaway view of another embodiment of the present invention.

A plugging apparatus 220 representing another embodiment of the present invention is shown in FIG. 6. Apparatus 220 includes an expandable sleeve 222 with a recess 224. Recess 224 cooperates with tapered member 28 in a manner similar to the cooperation of tapered member 28 with recess 24, or the cooperation of tapered member 32 with recess 26. Preferably, tapered member 228 has a generally conical outer shape and fits within a generally conical bore 224.

A threaded member 232 has a first threaded portion 239 that threadably engages a threaded bore of sleeve 222. Member 232 also includes a second threaded portion with threads 38. Threaded member 232 also includes a threaded bore 234. Preferably, the threads of bore 234 are of the opposite hand to threads 38 and 239. Most preferably, the threads of bore 234 are right-hand threads engageable with a standard fastener 240.

Tapered member 228 is captured loosely within recess 224 of sleeve 222. However, engagement and tightening of fastener 240 within bore 234 results in the end of fastener 240 pushing upon tapered member 228 so as to cause expansion of sleeve 222. Threaded member 232 includes a threaded portion 239 so that tapered member 228 may be first placed within recess 224, with member 232 subsequently threadably coupling to sleeve 222. However, those of ordinary skill in the art will recognize that there are ways other than threads to couple member 232 to sleeve 222. For example, sleeve 232 could be welded, brazed, adhered or otherwise bonded to member 222 without the use of threads 239. Apparatus 220 is placed within a hole and tightened in a manner similar to that of apparatus 20.

Figure 7A:
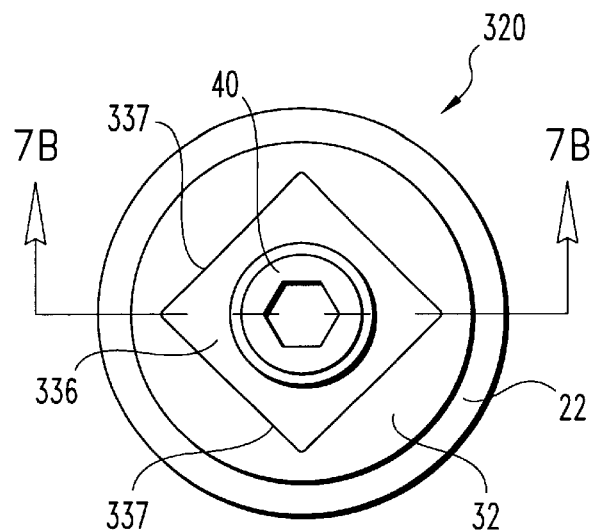
FIG. 7A is an end elevational view of another embodiment of the present invention.
Figure 7B:
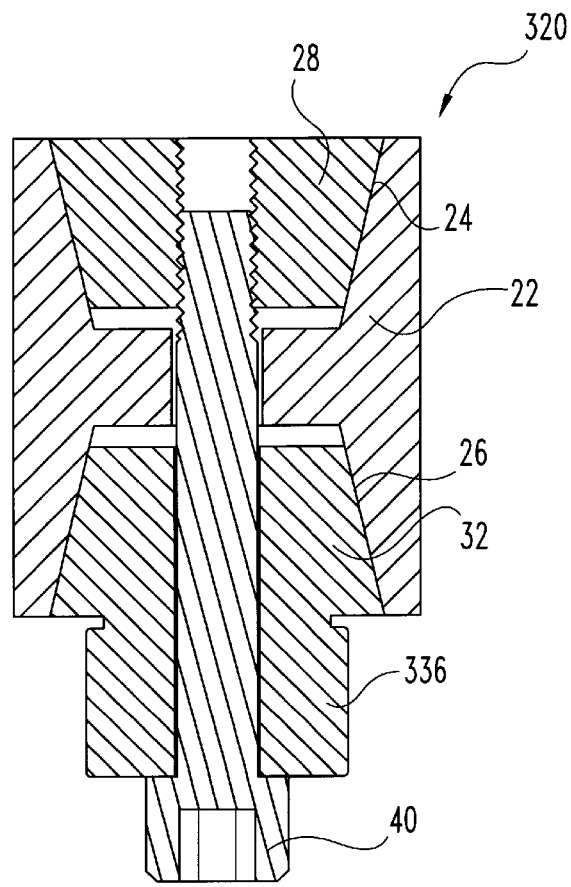
FIG. 7B is a cross sectional view of the apparatus of FIG. 7A as taken along line 7B—7B of FIG. 7A.

FIGS. 7A and 7B depict apparatus 320, another embodiment of the present invention. Apparatus 320 includes a tapered member 32 that is integral with a non-circular portion 336. As shown best in FIG. 7A, portion 336 preferably has a square shape for holding by a holding tool with square end drive. In one embodiment of the present invention, one or more of the four side faces 337 of portion 336 incorporates a recessed, spherical dimple that cooperates with a spring loaded ball within the holding tool, in a manner similar to the cooperation between a socket tool for driving bolts and a socket wrench. In this manner the holding tool maintains a grasp of apparatus 320 as apparatus 320 is being placed at a location within the passageway. Those of ordinary skill in the art will recognize suitable shapes other than a square shape for portion 336, and also other known methods for grasping the shape.

Figure 8:
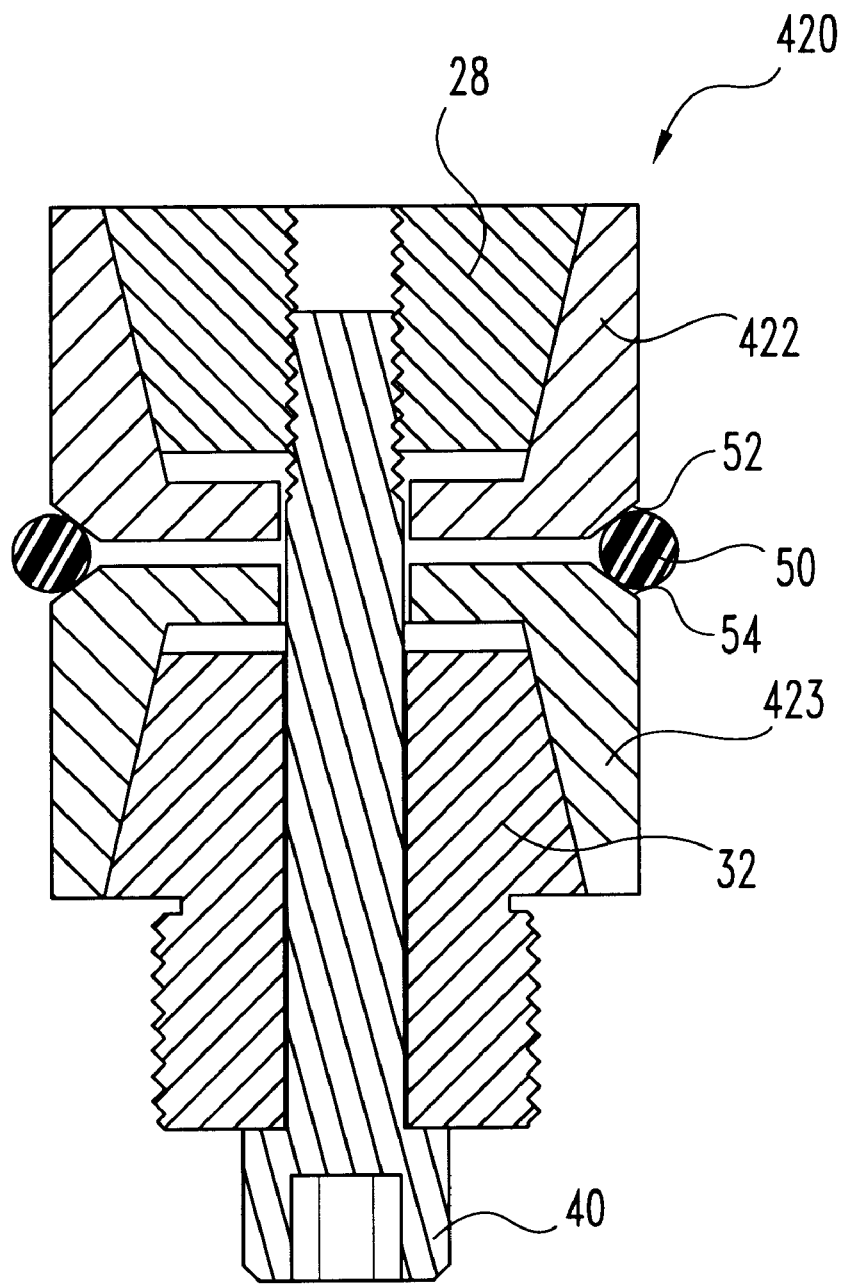
FIG. 8 is a cross sectional cutaway view of another embodiment of the present invention.

Apparatus 420, another embodiment of the present invention, is shown in FIG. 8. Although similar in respects to apparatus 20, apparatus 420 includes two preferably expandable sleeves 422 and 423. An elastomeric seal ring 50 is captured between a first groove 52 along one inner face of sleeve 422 and a second ring groove 54 along an opposing inner face of sleeve 423. Apparatus 420 is placed within a hole and tightened in a manner similar to that of apparatus 20, except that tightening of fastener 40 also causes the tapered grooves 52 and 54 to expand seal ring 50 outwardly to engage and seal against the inner surface of the hole. In some embodiments, tightening of fastener 40 also causes expandable sleeves 422 and 423 to expand into contact with the walls of hole after the opposing inner faces of sleeves 422 and 423 contact each other. In other embodiments, sleeves 422 and 423 do not expand into contact with the walls of the hole, and all sealing is performed by seal ring 50.

Those of ordinary skill in the art will recognize that various features shown and described among the various embodiments may readily be combined with features of other embodiments. By way of example, the two piece sleeve and O-ring of the embodiment depicted in FIG. 8 could be combined with the non-circular cross section tapered members of the embodiment shown in FIGS. 7A and 7B. The various combinations of features are also part of the present invention.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An apparatus for blocking a hole, comprising:
   a first tapered member with a first threaded portion, the first threaded portion having one of a right hand or left hand thread;
   a second tapered member with a second threaded portion, the second threaded portion having the other of the right hand or left hand thread; and
   an expandable sleeve with two ends, said sleeve slidably receiving said first tapered member in one end and receiving the second tapered member in the other end; and
   a fastener for engaging the first threaded portion;
   wherein tightening of said fastener expands said sleeve.

2. The apparatus of claim 1 wherein said sleeve has a first tapered recess for receiving the first tapered member and a second tapered recess for receiving said second tapered member, the first tapered recess being generally complementary in shape to the first tapered member, the second tapered recess being generally complementary in shape to the second tapered member.

3. The apparatus of claim 2 which further comprises a mold, wherein said mold defines the hole.

4. The apparatus of claim 3 wherein the second threaded portion has a left hand thread.

5. The apparatus of claim 4 wherein said fastener is an Allen bolt.

6. The apparatus of claim 4 wherein said expandable sleeve includes slots.

7. The apparatus of claim 4 wherein the first tapered recess has a conical shape, and the second tapered recess has a conical shape.

8. The apparatus of claim 4 wherein said expandable sleeve defines a bore, and said fastener is slidable through the bore for engaging the first threaded portion.

9. An apparatus for blocking a hole, comprising:
   a first tapered member with a first threaded portion;
   a second tapered member with a second threaded portion;
   a sleeve with two ends, said sleeve slidably receiving said first tapered member in one end and slidably receiving the second tapered member in the other end; and
   a tightenable fastener engaging the first threaded portion, wherein said apparatus is held by the second threaded portion when said fastener is tightened.

10. The apparatus of claim 9 wherein said first threaded portion has one of a right and or left-hand thread and said second threaded portion has the other of the right hand or left-hand thread.

11. The apparatus of claim 9 wherein said sleeve is expandable.

12. An apparatus for blocking a hole, comprising:
    a first tapered member with a first threaded portion;
    a second tapered member with a second threaded portion for holding the apparatus at a location in the hole;
    an expandable sleeve with two ends, said sleeve slidably receiving said first tapered member in one end and slidably receiving the second tapered member in the other end; and
    a fastener engaging the first threaded portion;
    wherein said first tapered member and said second tapered member expand said sleeve and block the hole when said fastener is tightened.

13. The apparatus of claim 12 which further comprises a mold, said mold defining the hole.

14. The apparatus of claim 13 wherein said first tapered member has a conical surface, and said second tapered member has a conical surface.

15. An apparatus for blocking a hole, comprising:
    a tapered member with a first threaded portion, the first threaded portion having one of a right hand or left hand thread, said first tapered member having a bore;
    a first expandable sleeve with a recess, said sleeve having a second threaded portion, the second threaded portion having the other of the right hand or left hand thread, said sleeve receiving said tapered member within the recess; and
    a fastener slidable within the bore and threadably engaging the second threaded portion;
    wherein tightening of said fastener causes said tapered member to expand said sleeve and block the hole.

16. The apparatus of claim 15 which further comprises:
    a second tapered member;
    a second sleeve with a seal groove and a recess, said second sleeve receiving said second tapered member within the recess; and
    an expandable seal ring,
    wherein said first expandable sleeve has a seal groove, said seal ring being between the seal groove of said second sleeve and the seal groove of said first expandable sleeve, and tightening of said fastener causes said seal ring to expand and block the hole.

17. The apparatus of claim 15 wherein said first tapered member has a first conical surface, and the recess has a second conical surface generally complementary to the first conical surface.

18. An apparatus for blocking a hole, comprising:
    a tapered member;
    an expandable sleeve with a recess, said sleeve receiving said tapered member within the recess, said sleeve having a threaded bore and a threaded cylindrical surface, the bore having one of a right hand or left hand thread, the surface having the other of the right hand or left hand thread; and
    a fastener threadably received within the threaded bore;
    wherein tightening said fastener causes said tapered member to expand said sleeve and block the hole.

19. The apparatus of claim 18 wherein said fastener is a bolt with right hand threads.

* * * * *

UNITED STATES PATENT AND TRADEMARK OFFICE
CERTIFICATE OF CORRECTION

PATENT NO. : 6,076,797
DATED : June 20, 2000
INVENTOR(S) : Kurt Schnautz

It is certified that error appears in the above-identified patent and that said Letters Patent is hereby corrected as shown below:

Title page,
Item [56], U.S.PATENT DOCUMENTS,
Line 3, please delete "Korencham" and insert in lieu thereof -- Korenchan --.

OTHER PUBLICATIONS,
Line 3, please delete "Tire" and insert in lieu thereof -- Tite --.

Column 1,
Line 55, please delete "an obvious" and insert in lieu thereof -- unobvious --.

Column 6,
Line 4, please delete "28" and insert in lieu thereof -- 228 --.

Column 7,
Line 62, please delete "and," first occurrence, to -- hand --.

Signed and Sealed this

Ninth Day of April, 2002

Attest:

JAMES E. ROGAN
Attesting Officer    Director of the United States Patent and Trademark Office